(12) United States Patent
Kumar et al.

(10) Patent No.: US 8,380,962 B2
(45) Date of Patent: Feb. 19, 2013

(54) SYSTEMS AND METHODS FOR EFFICIENT SEQUENTIAL LOGGING ON CACHING-ENABLED STORAGE DEVICES

(75) Inventors: Ajay Kumar, Maharashtra (IN); Rajesh Chepuri, Maharashtra (IN); Shailesh Marathe, Maharashtra (IN); Niranjan Pendharkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 235 days.

(21) Appl. No.: 12/856,985

(22) Filed: Aug. 16, 2010

(65) Prior Publication Data

US 2012/0042125 A1    Feb. 16, 2012

(51) Int. Cl.
*G06F 12/00* (2006.01)
(52) U.S. Cl. ........ 711/171; 711/118; 711/170; 711/173; 718/104
(58) Field of Classification Search .................. 711/171, 711/173, 118, 170; 718/104
See application file for complete search history.

(56) References Cited

U.S. PATENT DOCUMENTS

| 6,321,234 | B1 | 11/2001 | Debrunner |
| 6,886,080 | B1* | 4/2005 | Carey ............................ 711/148 |
| 7,139,909 | B2* | 11/2006 | Lee ................................ 713/100 |
| 7,461,231 | B2* | 12/2008 | Branda et al. ................. 711/173 |
| 2002/0108017 | A1* | 8/2002 | Kenchammana-Hoskote et al. ............................ 711/113 |
| 2004/0158764 | A1 | 8/2004 | Sonoda et al. |
| 2005/0243609 | A1 | 11/2005 | Yang et al. |
| 2005/0257020 | A1* | 11/2005 | Kashyap et al. ............... 711/170 |
| 2006/0020634 | A1 | 1/2006 | Huras et al. |
| 2006/0181928 | A1* | 8/2006 | Lee et al. ................. 365/185.22 |

* cited by examiner

*Primary Examiner* — Jae Yu
(74) *Attorney, Agent, or Firm* — Advantedge Law Group

(57) ABSTRACT

A computer-implemented method for efficient sequential logging on caching-enabled storage devices may include 1) identifying a storage device with a cache, 2) allocating space on the storage device for a sequential log, 3) calculating a target size for the sequential log based at least in part on an input/output load directed to the sequential log, and then 4) restricting the sequential log to a portion of the allocated space corresponding to the target size. Various other methods, systems, and computer-readable media are also disclosed.

18 Claims, 6 Drawing Sheets

SYSTEMS AND METHODS FOR EFFICIENT SEQUENTIAL LOGGING ON CACHING-ENABLED STORAGE DEVICES

BACKGROUND

Some applications may output data to a log for a variety of purposes, such as safely performing transactions with minimal latency, error logging, etc. In many cases, this log may take the form of a sequential log.

Sequential logs may exhibit a write-many, read-few input/output pattern, with logging activity beginning at the start of an allocated space and continuing sequentially until the log reaches the end of the allocated space and wraps around to the beginning again. Unfortunately, this format may result in several inefficiencies when the sequential log is maintained on a storage device with a cache front end. For example, the disk space allocated for the log may never get pinned to the cache since the writes to the log may occur sequentially over a large space. This may result in reads fetching data from the disk rather than the cache. Additionally or alternatively, sequential writes to the log may trigger frequent cache flushes, potentially impacting write performance to the log. Furthermore, the storage device may perform various unnecessary cache operations without regard to the context in which the sequential log operates. Accordingly, the instant disclosure identifies a need for efficient sequential logging on caching-enabled storage devices.

SUMMARY

As will be described in greater detail below, the instant disclosure generally relates to systems and methods for efficient sequential logging on caching-enabled storage devices. In one example, the systems described herein may accomplish such a task by 1) identifying a storage device with a cache, 2) allocating space on the storage device for a sequential log, 3) calculating a target size for the sequential log based at least in part on an input/output load directed to the sequential log, and then 4) restricting the sequential log to a portion of the allocated space corresponding to the target size.

When allocating space on the storage device for the sequential log, the systems described herein may allocate sufficient space for the sequential log to accept all write attempts during a peak load. In addition to restricting the size of the sequential log, in some examples the systems described herein may 1) recalculate the target size for the sequential log based at least in part on an input/output load directed to the sequential log and 2) increase the sequential log to the target size within the allocated space. In some examples, the systems described herein may dynamically calculate the target size as the input/output load changes.

The calculation of the target size may include a variety of information. For example, the calculation may include information relating to the consumption of data from the sequential log. In some contexts, the sequential log may serve a cluster of nodes. In these contexts, the calculation may include 1) identifying the cluster of nodes contributing to the input/output load and 2) calculating a target size for each node in the cluster based on the contribution of the node to the input/output load.

In addition to manipulating the size of the sequential log, the systems described herein may improve the efficiency of sequential logging through various cache-aware interventions. These may include 1) pinning the portion of the allocated space to the cache, 2) configuring the cache to disregard an extent within the allocated space that does not contain valid information for an application configured to use the sequential log, and/or 3) preventing the storage device from fetching a page from the storage device to the cache during a first write to the sequential log. The systems described herein may also avoid unwanted cache operations by 1) identifying a potential entry to the sequential log, 2) determining that the potential entry already exists within the sequential log, and then 3) blocking the potential entry from being reentered into the sequential log.

As will be explained in detail below, by restricting the bounds of sequential logs, the systems and methods described herein may improve the cache performance of storage devices on which the sequential logs are maintained. Furthermore, the systems and methods described herein may improve cache performance by making caching decisions with awareness of a sequential log and/or an application using the sequential log.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
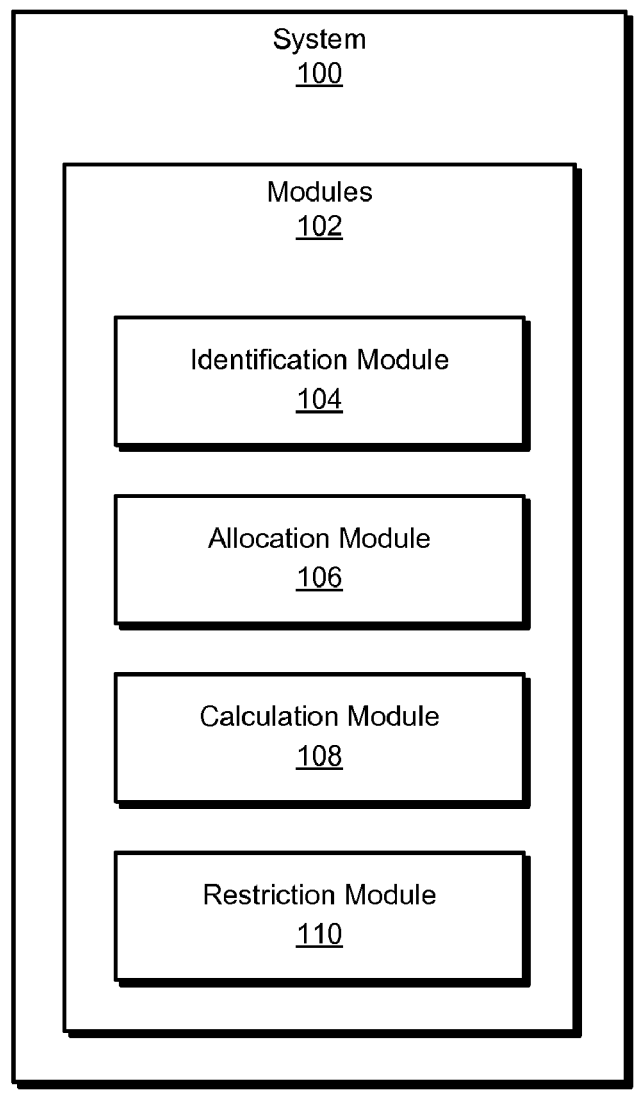
FIG. 1 is a block diagram of an exemplary system for efficient sequential logging on caching-enabled storage devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
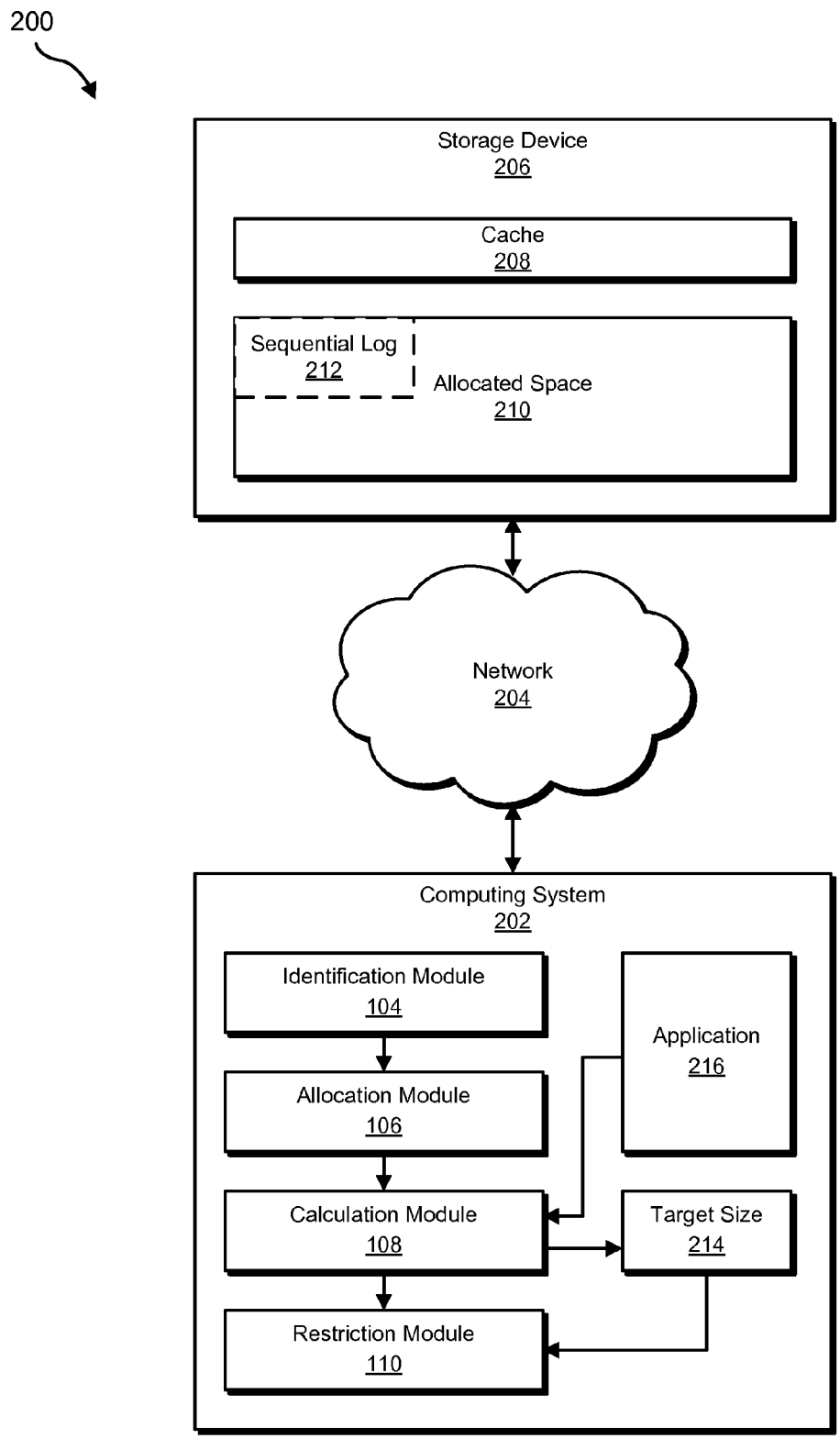
FIG. 2 is a block diagram of an exemplary system for efficient sequential logging on caching-enabled storage devices.
Figure 4:
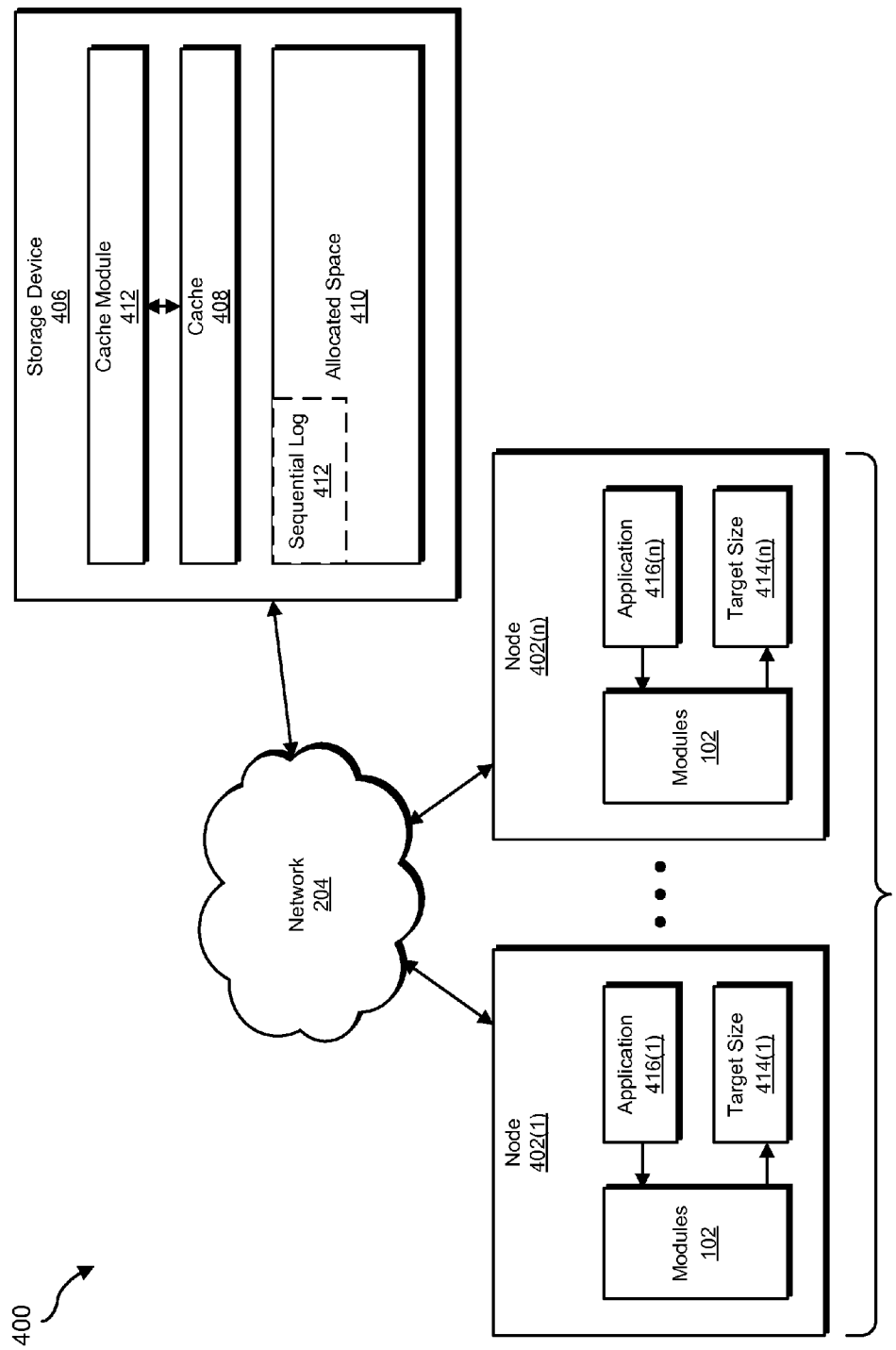
FIG. 4 is a block diagram of an exemplary system for efficient sequential logging on caching-enabled storage devices.

The following will provide, with reference to FIGS. 1, 2, and 4, detailed descriptions of exemplary systems for efficient sequential logging on caching-enabled storage devices.

Figure 3:
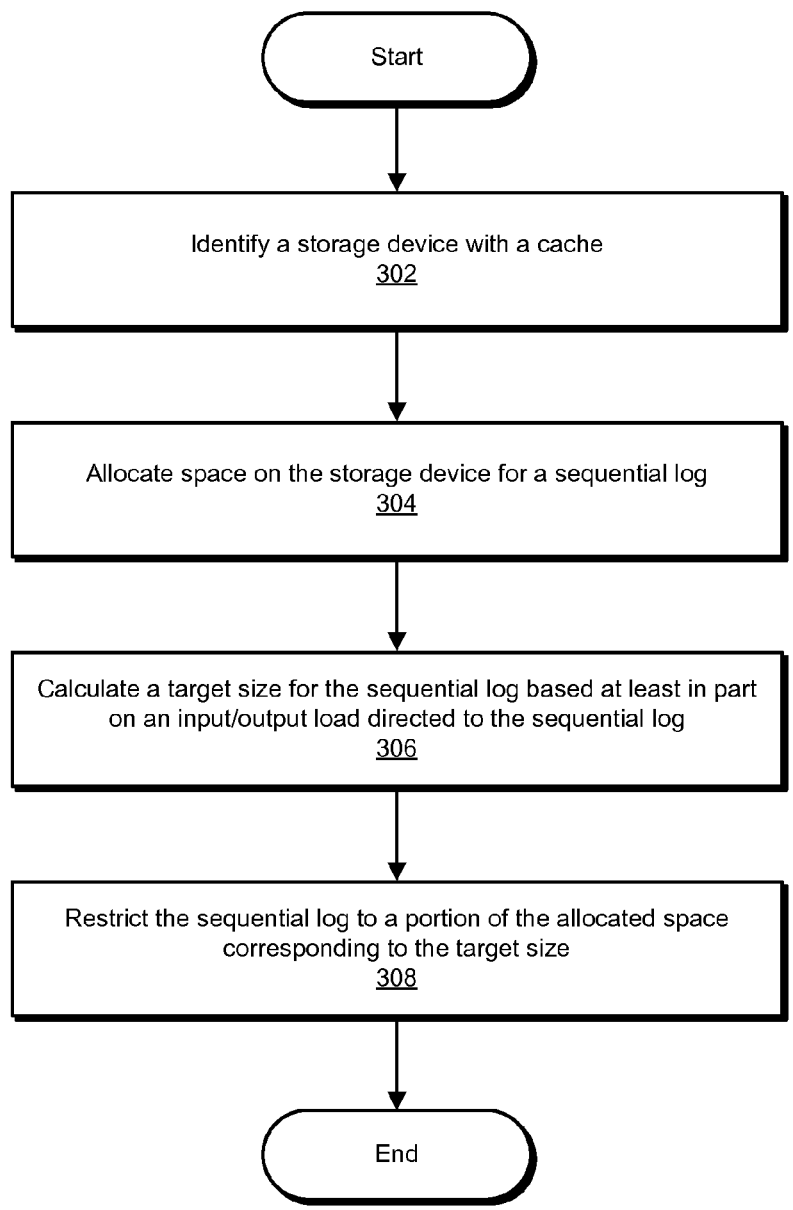
FIG. 3 is a flow diagram of an exemplary method for efficient sequential logging on caching-enabled storage devices.

Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for efficient sequential logging on caching-enabled storage devices. As illustrated in this figure, exemplary system 100 may include one or more modules 102 for performing one or more tasks. For example, and as will be explained in greater detail below, exemplary system 100 may include an identification module 104 programmed to identify a storage device with a cache. Exemplary system 100 may also include an allocation module 106 programmed to allocate space on the storage device for a sequential log.

In addition, and as will be described in greater detail below, exemplary system 100 may include a calculation module 108 programmed to calculate a target size for the sequential log based at least in part on an input/output load directed to the sequential log. Exemplary system may also include a restriction module 110 programmed to restrict the sequential log to a portion of the allocated space corresponding to the target size. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or storage device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing and network-based environments may provide various services and applications via the Internet. These cloud-based and network-based services (e.g., software as a service, platform as a service, infrastructure as a service, etc.) may be accessible through a web browser or other remote interface. Various functions described herein may be provided through a remote desktop environment or any other cloud-based or network-based computing environment.

As shown in FIG. 2, system 200 may include a computing system 202 in communication with a storage device 206 via a network 204. In one embodiment, and as will be described in greater detail below, computing system 202 may include modules 102 from FIG. 1 (e.g., identification module 104, allocation module 106, calculation module 108, and restriction module 110).

In one example, and as will be described in greater detail below, modules 102 may program computing system 202 to 1) identify a storage device (e.g., storage device 206) with a cache (e.g., a cache 208), 2) allocate space (e.g., allocated space 210) on the storage device for a sequential log (e.g., sequential log 212), 3) calculate a target size (e.g., target size 214) for the sequential log based at least in part on an input/output load directed to the sequential log (e.g., due to an application 216), and then 4) restrict the sequential log to a portion of the allocated space corresponding to the target size.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Storage device 206 generally represents any type or form of computing device that is capable of storing and/or retrieving data with a caching mechanism. Examples of storage device 206 include, without limitation, a hard disk drive or a solid-state drive.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202 and storage device 206.

FIG. 3 is a flow diagram of an exemplary computer-implemented method 300 for efficient sequential logging on caching-enabled storage devices. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a storage device with a cache. For example, at step 302 identification module 104 may, as part of computing system 202 in FIG. 2, identify storage device 206 with cache 208.

As used herein, the term "storage device" may refer to any physical, logical, and/or virtual device for storing data. For example, the storage device may include a single drive, a storage array, a portion of a storage array designated by a logical unit number, etc. Likewise, as used herein, the term "cache" may refer to any mechanism and/or component for facilitating data access by storing and/or making available data that may be likely to be accessed.

Identification module 104 may identify the storage device in any suitable manner. For example, identification module 104 may identify the storage device by reading a configuration file identifying the storage device. Additionally or alternatively, identification module 104 may identify the storage device by receiving a message from an application (e.g., a message from an application which uses the sequential log). In some examples, identification module 104 may identify the storage device by receiving a communication from the storage device. Identification module 104 may also query the storage device and/or look up information about the storage device to determine that the storage device includes the cache. In some examples, identification module 104 may also determine properties of the cache (e.g., in order to determine an optimal size for a sequential log from a caching perspective).

At step 304, one or more of the systems described herein may allocate space on the storage device for a sequential log. For example, at step 304 allocation module 106 may, as part of computing system 202 in FIG. 2, create allocated space 210 on storage device 206 for sequential log 212.

As used herein, the term "sequential log" may refer to any log, file, and/or data structure that stores data in sequence (e.g., on a storage device). In some examples, the sequential log may also be a rotating log (e.g., once the end of the sequential log is reached, writes continue at the beginning of the sequential log). The sequential log may also include metadata relating to which data within the sequential log is valid and/or unconsumed and which data within the sequential log is invalid and/or consumed.

The sequential log may exist in a variety of contexts. For example, the sequential log may serve as a mechanism for safely performing transactions with minimal latency (e.g., an application may commit a transaction to the sequential log instead of directly to a remote system or a busy database). In various examples, the sequential log may serve for data replication, journaling, system recovery, error checking, regression testing, etc.

Allocation module 106 may perform step 304 in any suitable manner. For example, allocation module 106 may allocate the space by requesting the space from a file system. Additionally or alternatively, allocation module 106 may create a partition on the storage device for the space. In some examples, allocation module 106 may allocate a contiguous space on the storage device for the sequential log.

Allocation module 106 may allocate any suitable amount of space for the sequential log. For example, allocation module 106 may allocate sufficient space for the sequential log to accept all write attempts during a peak load. Allocation module 106 may determine how much space is sufficient in any suitable manner. For example, allocation module 106 may identify a configuration parameter for the sequential log (e.g., set by an administrator, corresponding to a default value set by an application using the sequential log, etc.) indicating a sufficient amount of space for the sequential log.

At step 306, one or more of the systems described herein may calculate a target size for the sequential log based at least in part on an input/output load directed to the sequential log. For example, at step 306 calculation module 108 may, as part of computing system 202 in FIG. 2, calculate target size 214 for sequential log 212 based at least in part on an input/output load directed to sequential log 212 (e.g., from application 216).

Calculation module 108 may calculate the target size based on the input/output load in a variety of ways. For example, calculation module 108 may calculate the target size based on a percentage of the sequential log currently in use (e.g., the percentage of the sequential log occupied with valid data which has yet to be consumed by an application). Additionally or alternatively, calculation module 108 may calculate the target size based on a rate at which the sequential log grows. In some examples, calculation module 108 may calculate the target size based on an estimated and/or projected input/output load. For example, calculation module 108 may receive information from an application which writes to the sequential log indicating the input/output load.

Calculation module 108 may also use a variety of other information to calculate the target size. For example, calculation module 108 may calculate the target size based at least in part on consumption of data from the sequential log. As used herein, the term "consumption," as applied to data, may refer to any process whereby data is accessed and/or no longer needed by an application. Calculation module 108 may assess the consumption of data in a variety of ways. For example, calculation module 108 may identify how many references to the head of the sequential log exist. Additionally or alternatively, calculation module 108 may identify a rate of change in the percentage of the sequential log containing unconsumed data. In some examples, calculation module 108 may use other information to calculate the target size, such as characteristics of the cache on the storage device (e.g., the size of the cache, the sensitivity of the cache to multiple accesses, etc.).

In some examples, calculation module 108 may calculate the target size as part of a recalculation of the target size. For example, calculation module 108 may calculate a target size for the sequential log (and, as will be described in greater detail below, restrict the sequential log to the target size) and later recalculate the target size, which may result in the sequential log increasing in size or decreasing in size. In some examples, calculation module 108 may dynamically calculate the target size as the input/output load changes. For example, calculation module 108 may continuously and/or periodically monitor one or more indicators of the input/output load changes described above. In some examples, calculation module 108 may revise the target size upward when the sequential log has run out of space.

In some contexts, a cluster of nodes may contribute to the input/output load. In these contexts, calculation module 108 may 1) identify the cluster of nodes and then 2) calculate the target size for each node in the cluster based on the contribution of the node to the input/output load. For example, FIG. 4 illustrates an exemplary system 400 for efficient sequential logging on caching-enabled storage devices. As shown in FIG. 4, exemplary system 400 may include a cluster 402 of nodes 402(1)-(*n*). Nodes 402(1)-(*n*) may run applications 416(1)-(*n*), respectively. In this example, calculation module 108 may calculate target sizes 414(1)-(*n*) for a sequential log 412 on a storage device 406. Accordingly, each node in the cluster may effectively manage its active log space based on the application load on that node.

In some examples, the cluster of nodes may share the sequential log. In this example, calculation module 108 may combine the target sizes computed by the cluster of nodes to determine the target size for the sequential log. Additionally or alternatively, each node in the cluster of nodes may maintain a separate sequential log. In this example, the target size generated by calculation module 108 for each node may apply to the sequential log for that node.

At step 308, one or more of the systems described herein may restrict the sequential log to a portion of the allocated space corresponding to the target size. For example, at step 308 restriction module 110 may, as part of computing system 202 in FIG. 2, restrict sequential log 212 to a portion of allocated space 210 corresponding to target size 214.

Restriction module 110 may perform step 308 in any suitable manner. For example, restriction module 110 may change the point at which the sequential log wraps back around to the beginning of the allocated space. In some examples, restriction module 110 may wait to restrict the sequential log until after the sequential log has wrapped back around to the beginning of the allocated space and any logged data out of the bounds of the target size has been consumed.

As mentioned earlier, in some examples calculation module 108 may recalculate the target size for the sequential log and/or dynamically calculate the target size for the sequential log. In these examples, restriction module 110 may increase the size of the sequential log to the recalculated target size.

By regulating the size of the sequential log, restriction module 110 may enable portions of the sequential log space to be pinned to the cache of the storage device, thereby potentially improving I/O performance. Furthermore, fewer writes to the sequential log may trigger a cache flush (due to requiring space in the cache to perform the write), thereby potentially improving I/O performance and preventing cache flushes. After step 308, method 300 may terminate.

In some examples, the systems described herein may improve the efficiency of sequential logging through various operations on and/or with the cache. For example, FIG. 4 illustrates storage device 406 with a cache 408 and a cache module 412. Cache module 412 may perform a variety of functions in connection with the storage device and/or the cache to improve the efficiency of the cache with respect to the sequential log.

In some examples, cache module 412 may pin the portion of the allocated space corresponding to the target size (e.g., the space occupied by the sequential log) to the cache. Cache module 412 may pin the portion of the allocated space to the cache in any suitable manner. For example, cache module 412 may transmit an instruction to a cache mechanism of the storage device to pin the range of addresses on the storage device that correspond to the portion of the allocated space. By pinning the portion of the allocated space rather than the entire allocated space, cache module 412 may improve read performance from the sequential log without wastefully consuming cache space.

Cache module 412 may also configure the cache to disregard an extent within the allocated space that does not contain valid information for an application configured to use the sequential log. As used herein, the term "extent" may refer to any extent, block, region, page, and/or other unit of data. For example, cache module 412 may receive a communication from the application that the extent does not contain valid information. Cache module 412 may then transmit information to the cache indicating that the extent has no value. The cache may subsequently avoid a cache flush on behalf of the extent.

In some examples, cache module 412 may prevent the storage device from fetching a page from the storage device to the cache during a first write to the sequential log. For example, cache module 412 may configure the storage device to create a null (e.g., zeroed out) page instead of fetching the page. In this manner, cache module 412 may enable the cache to avoid an unnecessary perturbation of the current state of the cache.

In some examples, the systems described herein may improve the efficiency of the cache with respect to the sequential log by preventing unnecessary operations on the sequential log. For example, systems described herein may 1) identify a potential entry to the sequential log, 2) determine that the potential entry already exists within the sequential log, and then 3) block the potential entry from being reentered into the sequential log. For example, the systems described herein may inspect and/or filter logging activity by an application that writes to the sequential log. By preventing a redundant entry to the sequential log, the systems described herein may reduce caching activity associated with writing the redundant entry to the log, thereby potentially improving I/O response associated with the cache for other data within the sequential log.

As explained above, by restricting the bounds of sequential logs, the systems and methods described herein may improve the cache performance of storage devices on which the sequential logs are maintained. Furthermore, the systems and methods described herein may improve cache performance by making caching decisions with awareness of a sequential log and/or an application using the sequential log.

Figure 5:
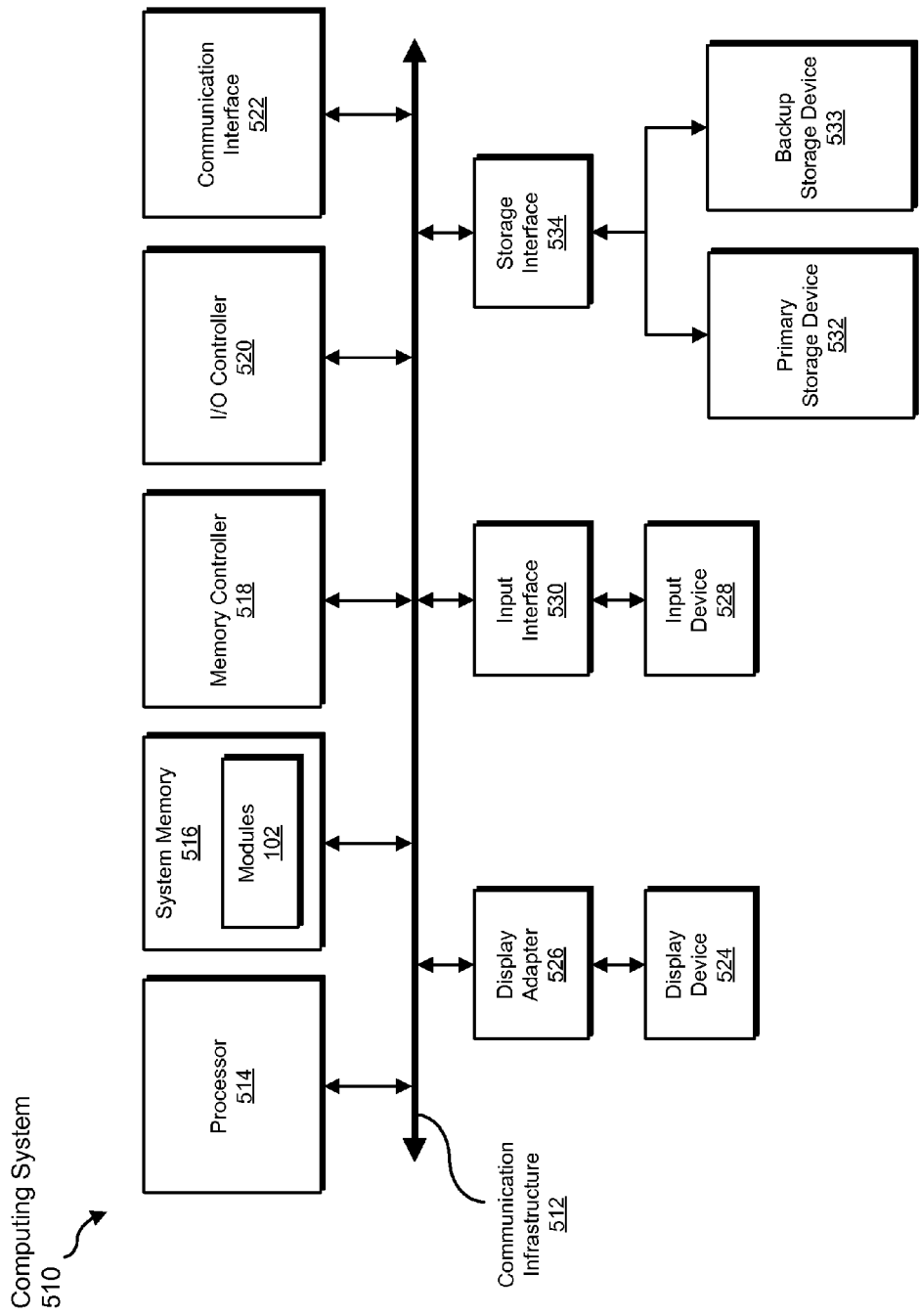
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, allocating, calculating, restricting, increasing, pinning, configuring, preventing, determining, and/or blocking steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, allocating, calculating, restricting, increasing, pinning, configuring, preventing, determining, and/or blocking.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, allocating, calculating, restricting, increasing, pinning, configuring, preventing, determining, and/or blocking steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, allocating, calculating, restricting, increasing, pinning, configuring, preventing, determining, and/or blocking steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, allocating, calculating, restricting, increasing, pinning, configuring, preventing, determining, and/or blocking steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, allocating, calculating, restricting, increasing, pinning, configuring, preventing, determining, and/or blocking steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
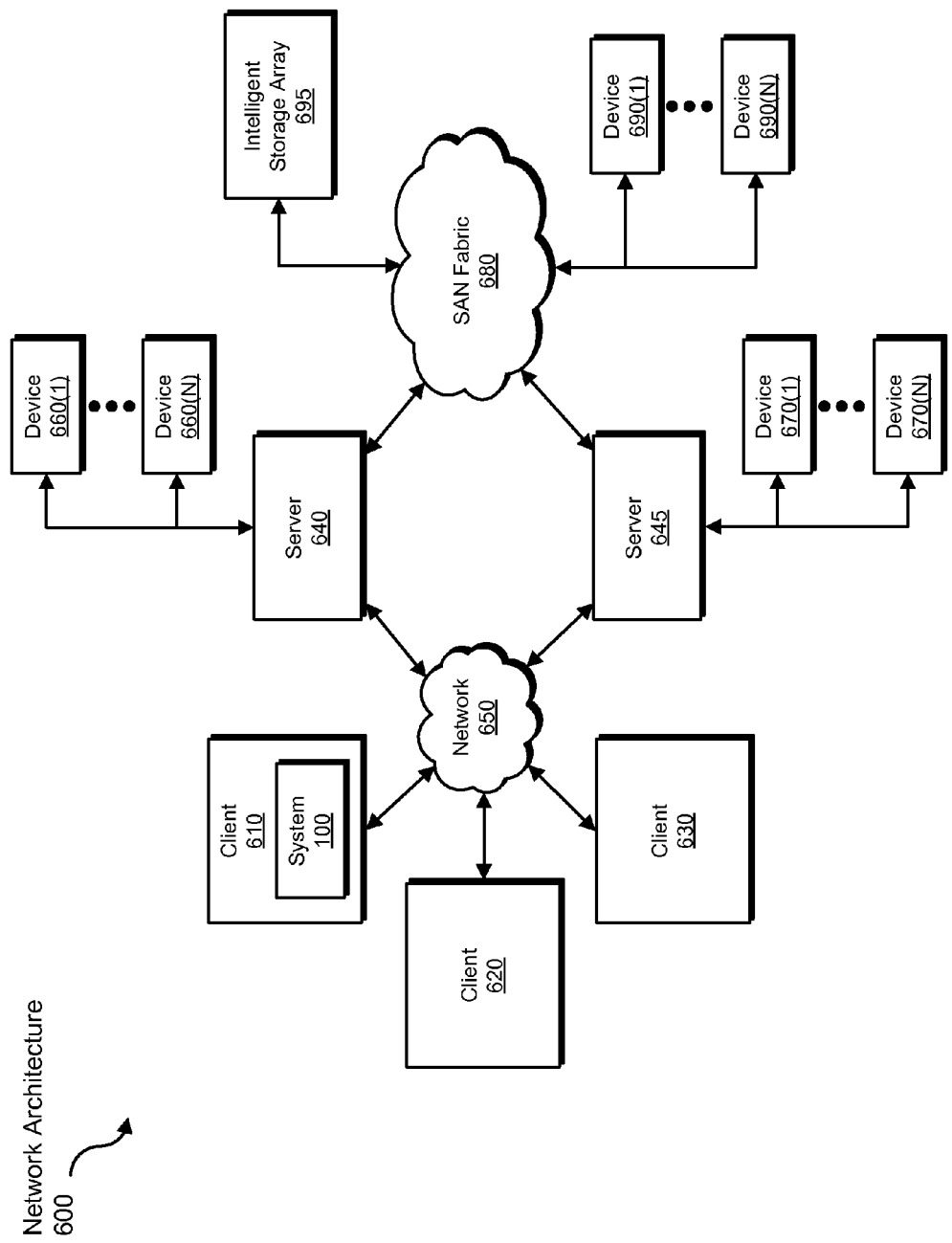
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, allocating, calculating, restricting, increasing, pinning, configuring, preventing, determining, and/or blocking steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for efficient sequential logging on caching-enabled storage devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a caching mechanism of a storage device into an efficient caching mechanism for sequential logging.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for efficient sequential logging on caching-enabled storage devices, at least a portion of the method being performed by a computing device comprising at least one processor, the method comprising:
    identifying a storage device with a cache;
    allocating space on the storage device for a sequential log;
    calculating a target size for the sequential log based at least in part on an input/output load directed to the sequential log;
    restricting the size of the sequential log to the target size so that the sequential log occupies less than all of the allocated space;
    preventing the storage device from fetching a page from the storage device to the cache during a first write to the sequential log.

2. The computer-implemented method of claim 1, wherein allocating the space comprises allocating sufficient space for the sequential log to accept all write attempts during a peak load.

3. The computer-implemented method of claim 1, further comprising:
    recalculating the target size for the sequential log based at least in part on an input/output load directed to the sequential log;
    increasing the size of the sequential log within the allocated space to the recalculated target size.

4. The computer-implemented method of claim 1, wherein calculating the target size for the sequential log based at least in part on the input/output load comprises dynamically calculating the target size as the input/output load changes.

5. The computer-implemented method of claim 1, wherein calculating the target size comprises:
    identifying a cluster of nodes, each node in the cluster contributing to the input/output load;
    calculating a target size for each node in the cluster based on the contribution of the node to the input/output load.

6. The computer-implemented method of claim 1, wherein calculating the target size comprises calculating the target size based at least in part on consumption of data from the sequential log.

7. The computer-implemented method of claim 1, further comprising pinning, to the cache, only space within the allocated space that is occupied by the sequential log.

8. The computer-implemented method of claim 1, further comprising configuring the cache to disregard an extent within the allocated space that does not contain valid information for an application configured to use the sequential log.

9. The computer-implemented method of claim 1, further comprising:
    identifying a potential entry to the sequential log;
    determining that the potential entry already exists within the sequential log;
    blocking the potential entry from being reentered into the sequential log.

10. A system for efficient sequential logging on caching-enabled storage devices, the system comprising:
    an identification module programmed to identify a storage device with a cache;
    an allocation module programmed to allocate space on the storage device for a sequential log;
    a calculation module programmed to calculate a target size for the sequential log based at least in part on an input/output load directed to the sequential log;
    a restriction module programmed to restrict the size of the sequential log to the target size so that the sequential log occupies less than all of the allocated space;
    a cache module programmed to prevent the storage device from fetching a page from the storage device to the cache during a first write to the sequential log;
    at least one processor configured to execute the identification module, the allocation module, the calculation module, the restriction module, and the cache module.

11. The system of claim 10, wherein the allocation module is programmed to allocate the space by allocating sufficient space for the sequential log to accept all write attempts during a peak load.

12. The system of claim 10, wherein:
    the calculation module is further programmed to recalculate the target size for the sequential log based at least in part on an input/output load directed to the sequential log;
    the restriction module is further programmed to increase the size of the sequential log within the allocated space to the recalculated target size.

13. The system of claim 10, wherein the calculation module is programmed to calculate the target size for the sequential log based at least in part on the input/output load by dynamically calculating the target size as the input/output load changes.

14. The system of claim 10, wherein the calculation module is programmed to calculate the target size by:
    identifying a cluster of nodes, each node in the cluster contributing to the input/output load;
    calculating a target size for each node in the cluster based on the contribution of the node to the input/output load.

15. The system of claim 10, wherein the calculation module is further programmed to calculate the target size by calculating the target size based at least in part on consumption of data from the sequential log.

16. The system of claim 10, further comprising a cache module programmed to pin, to the cache, only space within the allocated space that is occupied by the sequential log.

17. The system of claim 10, further comprising a cache module programmed to configure the cache to disregard an extent within the allocated space that does not contain valid information for an application configured to use the sequential log.

18. A non-transitory computer-readable-storage medium comprising one or more computer-executable instructions that, when executed by at least one processor of a computing device, cause the computing device to:
- identify a storage device with a cache;
- allocate space on the storage device for a sequential log;
- calculate a target size for the sequential log based at least in part on an input/output load directed to the sequential log;
- restrict the size of the sequential log to the target size so that the sequential log occupies less than all of the allocated space;
- prevent the storage device from fetching a page from the storage device to the cache during a first write to the sequential log.

* * * * *